March 17, 1931. E. P. O'CONNOR 1,797,015
BLOW-OFF VALVE
Filed July 15, 1929
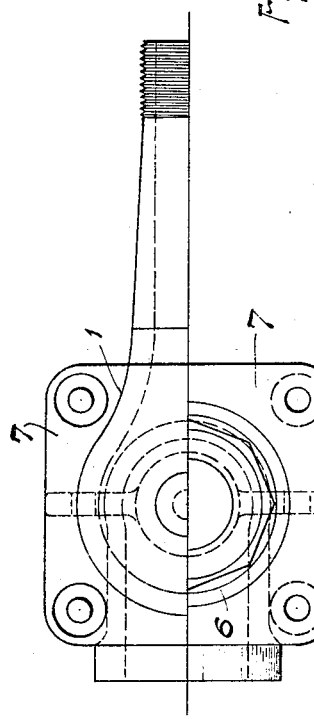
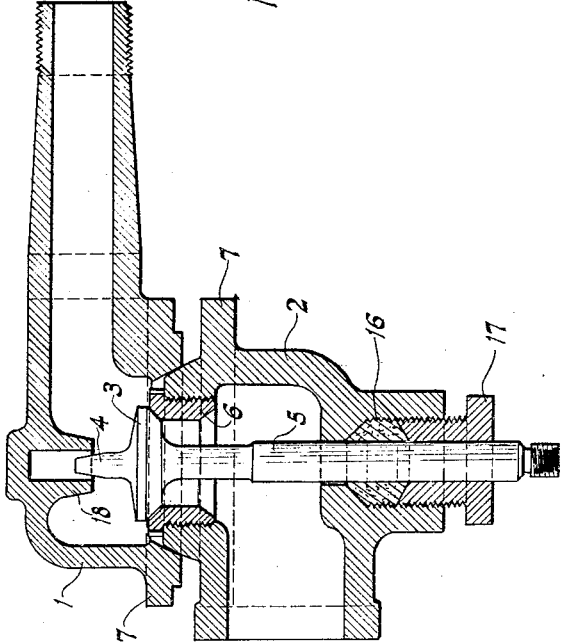
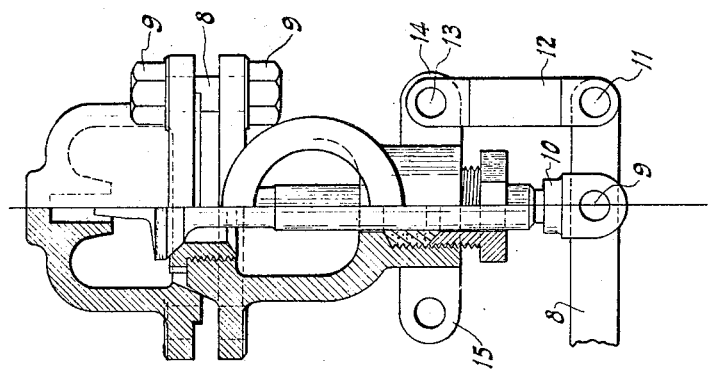
INVENTOR.
Edward P. O'Connor.
BY Thos. E. Scofield
ATTORNEYS.

Patented Mar. 17, 1931

1,797,015

UNITED STATES PATENT OFFICE

EDWARD P. O'CONNOR, OF PITTSBURG, KANSAS, ASSIGNOR OF ONE-HALF TO JOHN S. LEMLEY, OF ST. LOUIS, MISSOURI

BLOW-OFF VALVE

Application filed July 15, 1929. Serial No. 378,245.

This invention relates to improvements in a blow-off valve or blow-off cock used for the purpose of blowing down boilers to remove water, scale or sludge therefrom. Such a valve is a necessary adjunct to locomotives, stationary boilers or any type of power plants in which steam is used.

Fig. 1 is a sectional side view of the blow-off valve.

Fig. 2 is a plan view of half of the valve with the sections assembled and a plan view of half of the valve with the upper section removed.

Fig. 3 is a view in half section taken 90 degrees from the view shown in Fig. 1.

Referring to the drawings, the valve body consists of an upper section 1 and a lower section 2, the valve 3 being positioned therein and having an upper guide portion 4 and a lower stem 5. Within the lower section of the valve body is a removable seat 6. This seat is preferably screwed into the lower section of the valve body. The upper portion of the valve seat has a head formed so that the valve seat may be engaged by means of a wrench. This head may be either hexagonal or octagonal in form or to permit engagement by use of a flat headed wrench, or it may have holes or apertures in the top of the seat for engagement by means of a spanner wrench.

The upper and lower sections of the valve body have flanges 7 which are united by means of bolts 8 and nuts 9. A bevel connection between the upper and lower sections may be used, as shown in Fig. 1, or a gasketed connection may be employed to assure a pressure-tight fit between the two sections of the valve. The valve is manually operated by means of a lever arm 8 which is connected at 9 through a member 10, with the valve stem 5. The end of the lever 8 is pivoted at 11 to a link 12 which in turn is pivoted at 13 to an ear 14 extending out from the lower section of the valve body. A similar ear 15 may be provided on the opposite side to furnish a pivot diametrically opposite, should it be desired to reverse the position of the lever arm.

The valve stem extends through the bottom of the valve body and is maintained pressure tight by means of packing 16 held in place by means of an externally threaded gland nut 17. This gland nut is a feature of the invention, as it limits the usual type of gland and gland nut assembly to a single screw-threaded gland nut which is screwed into the threaded hole in the lower portion of the valve body and holds the packing material in place against the valve stem. In the upper section 1 of the valve body is formed a guide 18 into which the valve extension 4 moves when the valve is raised. This guide assures the proper travel and seating of the valve.

The valve itself is of conventional design, the head and stem being formed integral with corrosion-resisting material. The manual operation of the lever arm is also conventional.

The novelty lies primarily in the separation of the valve body substantially at the valve seat, so that a replacement or grinding of the valve seat may be effected with little delay and with a minimum of labor. Normally the valve seats are replaced through a plug in the top of the valve body and where corrosion of the seat or of the joint between the seat and body has taken place difficulty is encountered in removing the seat. More often than not, the valve seat must be removed with a cold chisel, which is harmful to the seat and its contour. Furthermore, to remove the seat, it is necessary to unscrew the valve connection from the boiler and invariably this is a difficult task due to the collection and accumulation of scale, impurities and rust.

With the present type of valve, the connection to the boiler may be left intact and the valve re-seated or replaced by unbuckling the bolts 8 and separating the valve at the flange connection, thus making the valve and the valve seat readily available for repair or replacement. The single packing gland assembly for the valve stem is an additional improvement and novel feature.

I claim as my invention:

A blow-off valve body having upper and lower sections separable substantially at the valve seat, a valve guide in the upper section of the valve body, and the valve and the packing gland for the valve stem in the lower body section.

EDWARD P. O'CONNOR.